United States Patent [19]

Dale

[11] Patent Number: 5,257,517
[45] Date of Patent: Nov. 2, 1993

[54] BICYCLE LOCK SLEEVE

[76] Inventor: James E. Dale, 65 Huntley Street, Toronto, Ontario, Canada, M4Y 2L2

[21] Appl. No.: 762,484

[22] Filed: Sep. 19, 1991

[51] Int. Cl.⁵ ............................................. E05B 67/38
[52] U.S. Cl. ...................................... 70/54; 70/416; 70/417
[58] Field of Search ...................... 70/51–56, 70/38–39, 417, 416

[56] References Cited

U.S. PATENT DOCUMENTS

| | | | |
|---|---|---|---|
| 2,375,488 | 5/1945 | Olson | 70/54 X |
| 3,777,517 | 12/1973 | Shwayder et al. | 70/53 |
| 4,064,716 | 12/1977 | Shwayder et al. | 70/53 X |
| 4,085,600 | 4/1978 | Bindari | 70/53 X |
| 4,829,795 | 5/1989 | Taylor | 70/56 X |
| 4,888,967 | 12/1989 | Kuo | 70/54 X |
| 4,918,949 | 4/1990 | Newbold | 70/417 X |
| 4,920,772 | 5/1990 | Denison | 70/56 X |
| 4,949,564 | 8/1990 | Barzilai | 70/417 |
| 4,955,932 | 9/1990 | Kofman | 70/52 X |
| 5,010,746 | 4/1991 | Zane et al. | 70/55 X |

Primary Examiner—Peter M. Cuomo
Assistant Examiner—Suzanne L. Dino

[57] ABSTRACT

The present application relates to a protecting sleeve for shielding and reinforcing a bicycle lock mechanism, which sleeve can conveniently be applied to many existing bicycle locks. The sleeve comprises an elongate body having a central bore sized to receive a cylindrical portion of a lock in which the lock mechanism is located. It has been found that this area of the lock is the weakest and the lock can be defeated by breaking the locking mechanism. The protecting sleeve includes intermediate its length a channel passage through which a locking member can pass for releasably engaging the locking mechanism. The protecting sleeve is preferably made of a high strength material, such as an aircraft aluminum alloy material which also acts as a thermal moderator.

11 Claims, 1 Drawing Sheet

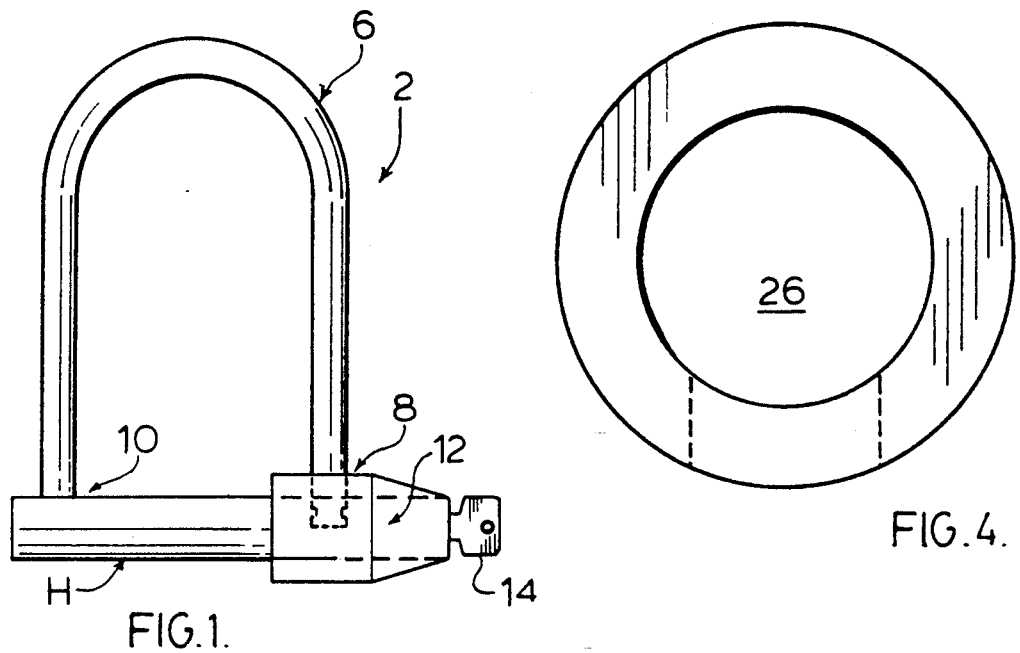
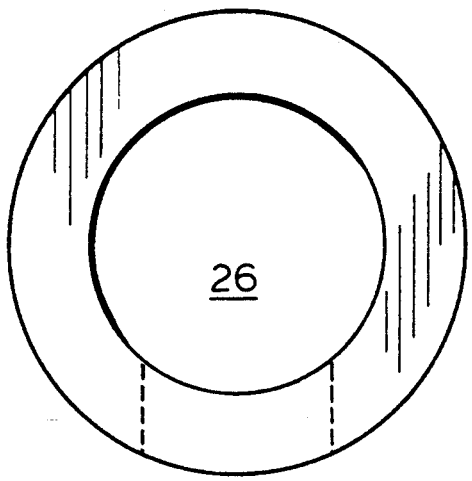
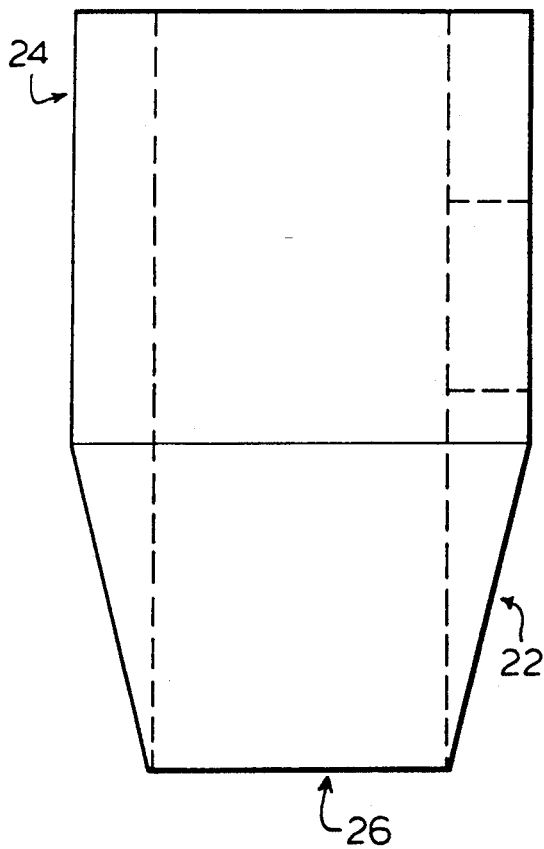
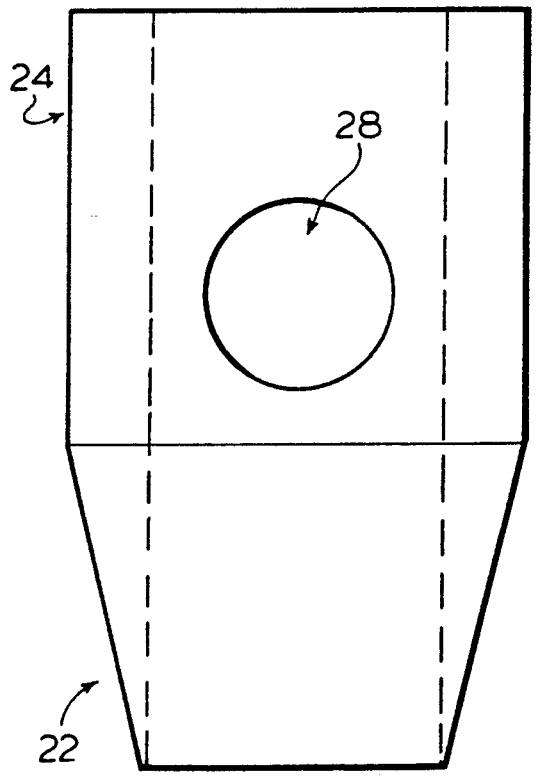

BICYCLE LOCK SLEEVE

FIELD OF THE INVENTION

The present invention relates to bicycle locks or other types of key locks used for securing of bicycles in particular. The invention relates in one application to a bicycle lock having a projecting cylindrical portion in which a locking mechanism is located and which a containing member engages the locking mechanism at a generally perpendicular angle. These types of locks can be improved by use of a protecting sleeve for thermally shielding and/or reinforcing the lock mechanism.

BACKGROUND OF THE INVENTION

Bicycles are becoming much more common and people are now purchasing bicycles which are relatively sophisticated with respect to their operation and the material from which they are made. Thus, the price of bicycles has increased and they have become an attractive target for thieves. A number of locking mechanisms have been proposed, including chains and cables, however these are easily defeated by using bolt cutters.

There is also a popular bicycle lock which has a cylindrical type base member in combination with a U-shaped capturing member which is releasably engageable with the lock. These locks are typically key operated and include a locking mechanism at one end of the base member. The locks have proven effective in deterring theft by means of bolt cutters, however, as with any locking device for protecting a valuable object, the thieves become creative and often uncover a system for breaking of such locks. It has been found, with locks of this type, such as those sold under the KRYPTONITE trademark, that the locks can be defeated by applying a cooling agent to the end of the lock including the locking mechanism and then applying a levered force to the locking mechanism by sliding a pipe over the projecting end of the lock mechanism and applying a large force to the pipe. The lock breaks in this area and the thief can then steal the article. The lock, in other respects, has been widely accepted and there are a host of locks of this type in existence and these locks are generally considered the best, widely available bicycle lock. On occasion, a cooling agent is used which makes a portion of the lock brittle, thereby reducing the force necessary for breaking the lock.

SUMMARY OF THE INVENTION

A protecting sleeve for thermally shielding and reinforcing a bicycle lock mechanism, according to the present invention, comprises an elongate body having a central bore sized to receive a cylindrical portion of a lock in which the lock mechanism is located. The protecting sleeve includes intermediate its length a channel passage through which a releasable locking member can pass to effect releasable engagement with the locking mechanism of the lock.

According to an aspect of the invention, the sleeve is tapered at one end of the elongate body through which the locking mechanism is accessible. This tapered portion makes it difficult to apply a simple levering tool to the sleeve.

The sleeve, due to its size, will cover the lock mechanism and, thus, make it more difficult to effectively cool the bicycle lock in the area of the locking mechanism, as the sleeve acts as a thermal shield. The combination of the sleeve and the strength of the lock at the locking mechanism has proven effective to prevent what has become a common method of breaking locks of this type.

BRIEF DESCRIPTION OF THE DRAWINGS

Preferred embodiments of the invention are shown in the drawings, wherein:

FIG. 1 is a side view showing a protecting sleeve applied to a lock;

FIG. 2 is a front view of the protecting sleeve;

FIG. 3 is a side view showing the protecting sleeve and the passage through the protecting sleeve; and FIG. 4 is a top view of FIG. 3.

DETAILED DESCRIPTION OF THE PREFERRED EMBODIMENTS

The bicycle lock 2 has a base member 4 having secured thereto a containing member 6. End 10 of the containing member 6 is captured by the base member 4 and is nonseparable therefrom. The free end 8 of the containing member 6 is releasable from the base member by means of the key 14 operating a key lock mechanism, generally shown as 12, which is within one end of the base member 4. The containing member 6, when released from the lock mechanism, moves outwardly away from the base member in a perpendicular type motion and is pivotable about the axis at the captured end 10.

The protecting sleeve 20 is of an elongate body having a tapered end 22 and a reinforcing end 24. A cylindrical bore 26 extends the length of the elongate body and is sized to closely sleeve the base member 4 about the portion thereof housing the key lock mechanism 12. The protecting sleeve 20 also includes a channel passage 28, preferably in the form of a circular bore, although other shapes are possible, through which the free end 8 of the bicycle lock 2 may pass to either be released from the base member 4 and clear the sleeve or be brought into locking engagement with the base member 4. The tapered end 22 of the protecting sleeve 20 is open to allow the key 14 to have access to the key lock mechanism 12. The reinforcing end 24 of the protecting sleeve 20 is positioned beyond the channel passage 28 to engage the lock in what is considered to be an inherently strong location.

The protecting sleeve 20 is preferably made of a high strength aluminum alloy, such as an aircraft alloy, which has good operating characteristics at a range of temperatures, with this protecting sleeve being of a length to not only reinforce the area of the lock in the locking mechanism, but also beyond the locking mechanism to engage what is considered to be an inherently strong portion of the lock. The aluminum material also acts to moderate any cooling agent applied to the lock mechanism as a function of the mass thereof and the thermal characteristics of the material.

The protecting sleeve, due to its tapered end 22, is not easily engaged by means of a circular pipe which otherwise can easily engage the projecting portion of the base member 4 having the key lock mechanism 12. The tapered end makes it much more difficult to effect a strong levering action on this portion of the lock and reinforces the lock at the point of breakage. The protecting sleeve also makes direct application of a cooling agent to the portion of the lock adjacent the locking mechanism much more difficult and dissipates the effect of the cooling agent as the sleeve is also cooled. Thus, the sleeve tends to thermally shield the lock adjacent the lock mechanism.

It has been found that this type of protecting sleeve makes breakage of locks or this type much more difficult and, thus, acts as a further deterrent for theft of a bicycle or object protected with such a lock having the protecting sleeve.

Although various preferred embodiments of the present invention have been described herein in detail, it will be appreciated by those skilled in the art, that variations may be made thereto without departing from the spirit of the invention or the scope of the appended claims.

I claim:

1. A protecting sleeve of high strength material which acts as an accessory for shielding and reinforcing a conventional bicycle lock mechanism against breakage, said protecting sleeve comprising an elongate body having a central bore sized to receive a cylindrical portion of a lock in which the lock mechanism is located, said protecting sleeve including intermediate its length a channel passage, opening into the central bore, through which a containing member of the lock can pass for releasably engaging or releasing the containing member from the lock mechanism, and wherein said sleeve includes a tapered end portion extending to adjacent said channel passage whereby gripping on the end portion by means of a hollow cylindrical pipe to effect a lever action on said protecting sleeve is difficult.

2. A protecting sleeve as claimed in claim 1 wherein said channel passage is a port intermediate the length of the elongate body.

3. A protecting sleeve as claimed in claim 1 wherein said sleeve is made of a high strength aluminum alloy.

4. A protecting sleeve as claimed in claim 3 wherein said central bore is cylindrical.

5. In combination a bicycle lock and a protecting sleeve of high strength material which is applied as an accessory to the bicycle lock to reinforce the bicycle lock against breakage; said bicycle lock comprising a cylindrical base member, a captured 'U' shaped containing member pivotally and reciprocably attached at one end of said base member, said 'U' shaped containing member having a free end releasably engageable with said cylindrical base member at a locking point on said base member, said 'U' shaped containing member being movable from a locked position relative to said base member to a released position relative to said base member, said base member having a projecting cylindrical end portion extending beyond said locking point and accommodating a key operated lock mechanism within said base member operable by inserting a key axially at an end of said base member; said protecting sleeve comprising an elongate body having a central bore sized to accommodate said projecting cylindrical end of said base member as said elongate body sleeves the portion of the base member containing said lock mechanism and sleeves a limited extent of said base member beyond said locking point to reinforce said base member and said locking mechanism on either side of said locking point against breakage, said protecting sleeve intermediate its length having a channel passage through which said free end of said containing member extends to releasably engage said lock mechanism within said base member.

6. In combination a removable protecting sleeve for shielding and reinforcing a conventional bicycle lock against breakage when applied thereto as an accessory, and a separate and distinct conventional bicycle lock, said bicycle lock having a lock mechanism located in a projecting cylindrical portion which releasably engages a 'U' shaped containing member movable from a released position, allowing bicycle components to be captured by said containing member, to a locked position with said containing member being maintained in a locked position when engaged by said lock mechanism, said protecting sleeve comprising an elongate body having a central bore sized to receive said projecting cylindrical portion of said bicycle lock in which the lock mechanism is located, said protecting sleeve including intermediate its length a channel passage, opening into the central bore, through which said containing member of the lock can pass for releasably engaging or releasing the containing member from the lock mechanism, said removable protecting sleeve reinforcing said projecting cylindrical portion of said bicycle lock and a limited portion of said bicycle lock adjacent to and on either side of said containing member.

7. In combination as claimed in claim 6 wherein said channel passage is a port intermediate the length of the elongate body.

8. In combination as claimed in claim 7 wherein said removable protecting sleeve is tapered at an end of the elongate body about the lock mechanism and said lock mechanism is accessible at the end of the protecting sleeve by means of said central bore.

9. In combination as claimed in claim 8 wherein said protecting sleeve is made of a high strength aluminum alloy.

10. In combination as claimed in claim 9 wherein said central bore of said protecting sleeve is cylindrical.

11. In combination as claimed in claim 6 wherein said protecting sleeve to one side of said channel passage includes a tapered end portion extending to about said channel passage whereby gripping on the end portion by means of a hollow cylindrical pipe to effect a lever action on said protecting sleeve is difficult.

* * * * *